United States Patent

[11] 3,620,835

[72] Inventors Karl Drittler
Geesthacht;
Hartmut Luhleich, Elbe, both of Germany
[21] Appl. No. 737,195
[22] Filed June 14, 1968
[45] Patented Nov. 16, 1971
[73] Assignee Gesellschaft fur Kernenergieverwertung in Schiffbau und Schiffahrt m.b.H.
Hamburg, Germany
Continuation-in-part of application Ser. No. 604,653, Dec. 27, 1966, now abandoned.

[54] METHOD OF MAKING NUCLEAR FUEL ELEMENTS
4 Claims, 11 Drawing Figs.

[52] U.S. Cl. .................................................. 117/215, 29/182.3, 117/106, 117/220, 176/82, 176/91
[51] Int. Cl. ...................................................... B22f 7/02
[50] Field of Search ........................................... 176/68, 71, 82, 91, 91 SP; 29/420.5, 527.2, 182.3; 117/69, 71, 107.2, 215, 220, 106; 75/208

[56] References Cited
UNITED STATES PATENTS

| | | | |
|---|---|---|---|
| 2,864,758 | 12/1958 | Shackelford .................. | 176/91 X |
| 3,042,598 | 7/1962 | Crowther ...................... | 176/10 |
| 3,122,595 | 2/1964 | Oxley ............................ | 176/91 X |
| 3,275,525 | 9/1966 | Bloomster et al. ............. | 176/67 X |
| 3,285,825 | 11/1966 | Jens ............................... | 176/68 |
| 3,304,235 | 2/1967 | Granata et al. ................ | 176/67 X |

Primary Examiner—Carl D. Quarforth
Assistant Examiner—Gary Solyst
Attorney—Walter Becker ABSTRACT: The present invention concerns a nuclear fuel element in the shape of a wire or rod which includes: a rodlike or wirelike inner carrier element of high melting temperature metal selected from the group consisting of molybdenum, tungsten, tantalum and chromium, a layer of material selected from nuclear fuel and nuclear breeder material arranged around and supported on said carrier element and being heat resistant up to a temperature above 2,000° C., and an outer envelope surrounding said layer and selected from pyrolytic graphite and ceramics for preventing the fission products from penetrating to the outside of the fuel element.

PATENTED NOV 16 1971 3,620,835
SHEET 1 OF 2
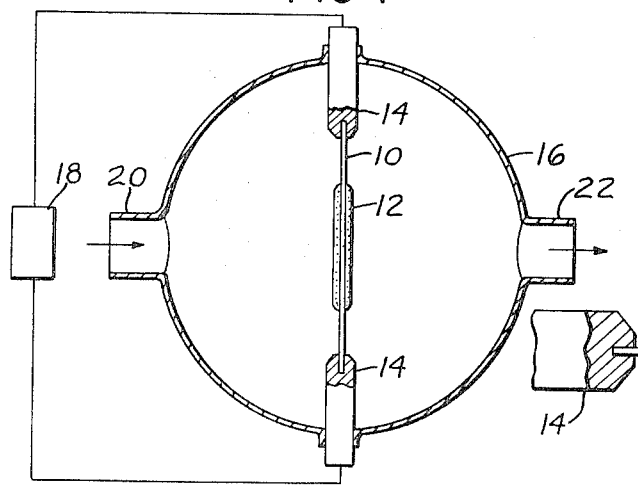
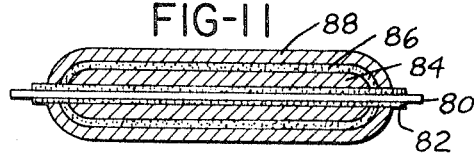
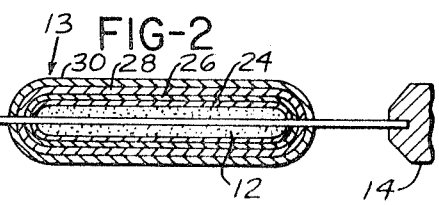
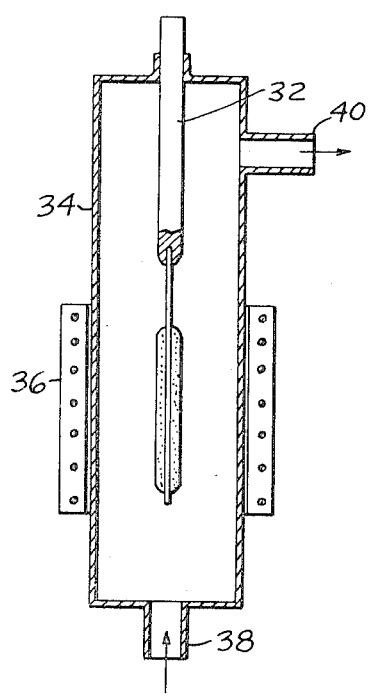
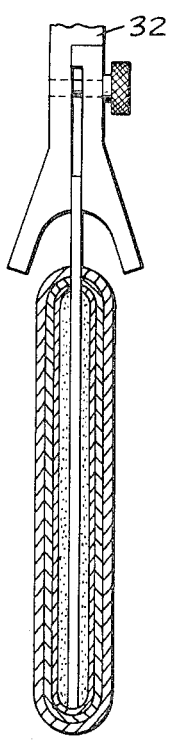
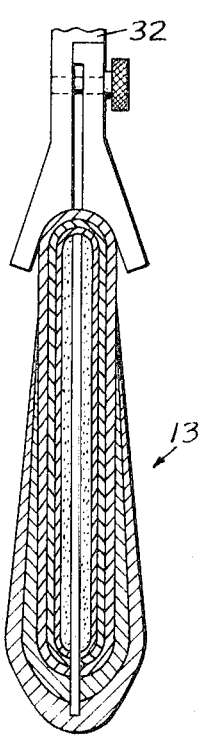
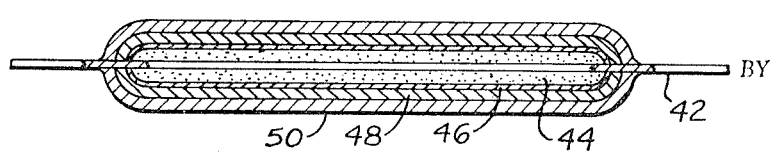
INVENTORS:
Karl Drittler
Hartmut Lobleich
BY Walter Becky

METHOD OF MAKING NUCLEAR FUEL ELEMENTS

RELATED APPLICATION

The present application is a continuation-in-part application of Karl Drittler, et al., Ser. No. 604,653; filed: Dec. 27, 1966, now abandoned.

The present invention relates to a nuclear fuel element for use in nuclear power reactors and like installations.

Nuclear fuel elements are, of course known, and take many forms, such as rodlike, tubular, and particulate. In most such elements, it is most important, as a safety measure, to prevent products of fission from migrating away from the fuel element. Various methods have been proposed for preventing such migration of fission products, one method involving the use of a coating material on the fuel element which will form a barrier to the fission products while still permitting free transfer of heat from the fuel region of the fuel element to the heat-absorbing medium provided.

An object of the present invention is the provision of a novel nuclear fuel element and a method of making such a fuel element in which the important fission products barrier coating can easily be applied in the form of a uniform and continuous layer.

It is also an object of the present invention to provide a compact nuclear fuel element which is safely and uniformly coated.

Still another object of the present invention is the provision of a fuel element having the maximum compactness.

More specifically, the present invention consists in a wire or rod-shaped nuclear fuel element which includes an inner supporting carrier element of high melting temperature metal selected from the group consisting of molybdenum, tungsten, tantalum and chromium, a layer of material selected from nuclear fuel and nuclear breeder material arranged around and supported on said carrier element and being heat resistant up to a temperature above 2,000° C., and an outer envelope completely surrounding and enclosing said layer and made of pyrolytic graphite for preventing the fission products from penetrating to the outside. The present invention further contemplates the provision of a buffer layer on at least one of the outside and inside of the fuel or breeder material layer.

As nuclear fuel may be used the oxide, carbides and nitrides of uranium-233 and uranium-235, and also the oxides, nitrides and carbides of plutonium-239.

As breeder material may be used the oxides, carbides and nitrides of thorium and uranium-238.

The objects referred to above, as well as still other objects and advantages of the present invention, will appear more clearly from the following specification in connection with the accompanying drawing, in which:

FIG. 1 shows one form of device for making a fuel element according to the present invention;

FIG. 2 shows the fuel element of FIG. 1 with several outer layers deposited on the inner fuel layer;

FIG. 3 shows another form of device for making a fuel element according to the present invention;

FIG. 4 shows a special holder for a carrier element which forms the core of a fuel element;

FIG. 5 shows how the holder of FIG. 4 is used to hold the fuel element when the fuel element is inverted in the holder so the exposed end of the carrier element can be coated;

FIG. 6 shows the use of a graphite rod as a support and carrier element for the fuel element;

FIG. 11 shows a modification.

Figure 7:
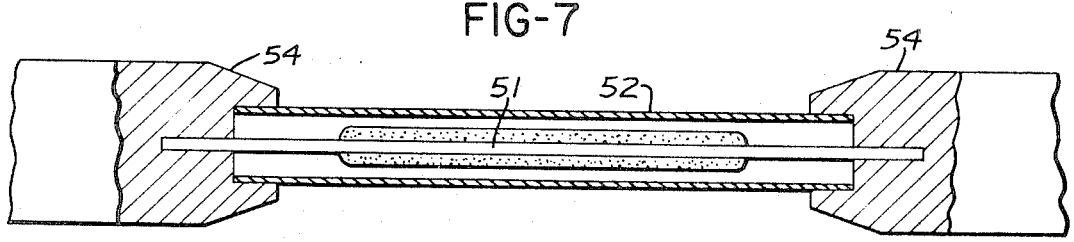
FIG. 7 is a view showing a fuel element supported inside a graphite pipe for heating purposes.

FIG. 2 shows a nuclear fuel element according to the present invention with a carrier element 10 in the form of a wire of high melting temperature metal selected from the group consisting of molybdenum, tungsten, tantalum and chromium, a layer 12 of a material selected from nuclear fuel and mixtures thereof with nuclear breeder material arranged around said carrier element 10 and being heat resistant up to a temperature above 2,000° C., and an envelope generally designated 13 and surrounding said layer 12. The several layers, shown in FIG. 2, and forming the envelope 13, will be explained later.

While according to FIG. 2 the wire ends stick out from the envelope 13, according to FIG. 5 the wire is completely enclosed in the envelope 13. A further modification employs a buffer layer immediately surrounding the wire while a second buffer layer is interposed between the fuel layer and the outer envelope. The buffer layers may consist of low-density graphite, low-density pyrocarbon or spongy silicon carbide. The carrier element itself may be of any desired form, for instance, it may be helically wound.

The employment of carrier elements according to the present invention improves the methods of providing uniform coatings. If the carrier element is freely supported during the coating process, a uniform coating on every side of the carrier element can easily be provided without special aids. These coated wires or rods can then be used in the same way as coated spherical particles in the arrangement of nuclear fuel or breeder components in nuclear power reactors or similar installations.

When producing the coated wires or rods, the nuclear fuel or breeder material or both must first be applied thereto in the form of a layer or layers. To this end, a method has been found which is especially advantageous. This method consists in providing above or below the layer or above, between and below the layers, as the case may be, layers of another material, one or more of the external layers preferably having the function of preventing the complete or partial liberation of fission products.

If the carrier elements have the form of, for instance, wires made of high melting metals, such as molybdenum, tungsten, tantalum or chromium, the mechanical properties of these metals will permit coatings to be applied thereto at temperatures exceeding 2,000° C., whereas conventional methods of coating proceeded at about 800° C. to 1,900° C. The higher the temperature during layer formation, the more resistant will the resultant layers prove to be in operation. Even at temperatures above 2,000° C., the dimensions of the carrier rods may be such that the overall diameter of the coated wires hardly exceeds the diameter of coated particles; namely, a few tenths of a millimeter.

The mechanical properties of the high melting metals are apparent from the following: If the carrier element consists of a tantalum wire having a diameter of one twentieth of a millimeter, the tensile load at 1,600° C. may still be of the order of a few hundredths of a kilopound, without exceeding half the actual tensile strength.

The carrier elements and the applied layers usually have different coefficients of thermal expansions. The layer are applied at high temperatures. When said layers are cooling off, stresses arise because of the difference in the coefficients of thermal expansion. Consequently, only such substances can be combined with each other which upon cooling do not prevent the coated wire from fulfilling its functions. If, for example, a wire of one of the above-mentioned high melting metals is used as the carrier material, and pyrolytic graphite is applied in layers to prevent the fission products from being set free, then the thermal expansion of such layers would be less than that of the wire. Assuming that the ratio of the radius of the wire to the thickness of the layers were 1 to 4, the wire would not break when it cools; it would merely be prestressed.

The coated wire can still be bent within limits without its functions being impaired. The ratio of bending radius to the overall diameter of the coated wire of the above-mentioned example will be of the order of 500 to 1,000.

If coated wires or rods are used in thermal reactors, it must be borne in mind that the neutron cross section for thermal neutrons of the carrier element must not be too high. When using a carrier element having a neutron cross section exceeding a few barns, difficulties will arise unless the carrier element can be made sufficiently thin in relation to the layers for the total cross section to be only slightly changed. This is the case when using high melting metals.

According to another feature of the invention the nuclear fuel and/or breeder substance has the form of a wirelike rod coated with high-temperature-resistance material. If the wire or the wires are kept freely suspended, a uniform coating of the nuclear fuel and/or breeder substance can be easily provided without the provision of supplementary aids. In the same way as in conventional coated particles, the coated wirelike rods can then be used in arrangements of nuclear fuel or breeder substance, or both, in nuclear power reactors or like installations.

The wirelike rods differ in thermal expansion from the enveloping layers. The layers are applied at elevate temperatures. During cooling the differential thermal expansions generate stresses. Consequently only such substances are combined which upon cooling do not prevent the coated wirelike rod from functioning. The wirelike rods may have any desired cross section and they may also contain additives or admixtures.

EXAMPLE I

A metal rod of nuclear fuel is inserted into a tubular sheath of tungsten. The sheath together with the rod-shaped nuclear fuel is then drawn down to a wire, to produce a core of nuclear fuel surrounded by a thin tube. Preferably, a layer consisting of a pulverized material, such as graphite or magnesia, which absorbs the fission products is interposed between the core of nuclear fuel and the tube.

EXAMPLE II

A pulverized material containing the nuclear fuel substance is introduced into the space between a rod and a tubular sheath of high molybdenum materials. The tubular sheath is then drawn down to a wire. The nuclear fuel will then be contained in the layer between the core and the sheath. The drawbacks which otherwise arise when a metallic nuclear fuel is used are thus avoided.

The different materials employed have different coefficients of thermal expansion. Only such substances are combined in the arrangement according to the invention which will not cause the generation of excessive thermal stresses. If excessive thermal stresses are generated the arrangement would cease to be functionally useful.

The manner in which fuel elements, according to the present invention, can be made will be more clearly understood from the following description which gives specific examples of fuel elements and the devices for making the fuel elements as shown in the drawings.

As a carrier element, a wire 10 of a high melting point metal, for example, W, Nb, Ta, or Mo is employed and is coated with a layer 12 of nuclear fuel or breeder material or a mixture thereof. For instance, $UO_2+ThO_2$ at the ratio of from 1:5 to 1:12 which is intermixed with a binder, as, for instance, an infra-active synthetic material cement, such as phenol resin.

Thereupon the wire with the applied nuclear fuel thereon (the term nuclear fuel includes nuclear fuel and mixtures of nuclear fuel and breeder material) is held in holders 14 in a chamber 16 and is heated in a vacuum or in an inert gas atmosphere as a result of which the binder disintegrates at temperatures of for instance up to a maximum of 2,000° C. and, at a still higher temperature, is graphitized.

The heat is developed by an electric current from a source 18 which may be direct or alternating. The nuclear fuel is finally sintered by heating to temperatures up to approximately 2,200° C. Subsequently, by disintegrating a hydrocarbon, preferably acetylenes, on the wire, a layer with a thickness of up to 50 μm is separated from the porous pyrocarbon and deposited on the nuclear fuel as a sponge layer or a buffer layer. The purpose of this layer consists in catching recoil atoms which form during the nuclear fission so that they will not impact upon and destroy the next layer of pyrocarbon of high density. Moreover, the said buffer layer also serves for catching the volume expansion of the nuclear loss or waste.

This last-mentioned layer is followed by the deposition of further layers at a thickness of, for instance, from 50 to 100 μm and which layers are intended to prevent a freeing of the fission products. These layers consist of pyrocarbon of high density which is formed by the pyrolysis of hydrocarbons. Also a silicon carbide layer can be applied by thermal disintegration of silicon hydrocarbons because fission products determined by silicon carbide can be better retained than by pyrocarbon. FIG. 2 shows, wire 10, layer 12 of fuel, buffer layer 24, and three further layers 26, 28 and 30.

The hydrocarbon or silicon hydrocarbon, is fed into an evacuated chamber in which the electrically heated wire is located and the reaction products are withdrawn by means of a pump or they are conveyed through the chamber by means of an inert gas flow which passes over the heated wire.

The chamber 16 has an inlet 20 and an outlet 22 by means of which reagent gases are passed through the chamber.

The wire, covered by a nuclear fuel by the process described above, is suspended from one end, is heated inductively and, as described above, is covered with a layer of pyrocarbon. This can be done as shown in FIG. 3 wherein the wire is suspended from one end by holder 32 in chamber 34, coil 36 inductively heats the wire in the chamber while gases can enter inlet 38 and be withdrawn from outlet 40. When the wire, after the application of two or more layers, is suspended with the already coated end, (see FIG. 5) a complete coating of the wire will be obtained after the application of further layers.

Instead of a wire, a graphite rod may be employed as a carrier element. The treatment is effected in the same manner as set forth above. The advantage of the graphite rod is seen in a better closure of the seam between graphite rod and coating layer inasmuch as materials of the same type abut each other. This modification is shown in FIG. 6, wherein the graphite rod is indicated at 42 with the fuel layer at 44, the further layer at 46 and two pyrocarbon layers at 48 and 50 which merge with rod 42.

The graphite rod may also be heated inductively and coated as explained above in connection with FIG. 3. Other methods of heating the rod can also be used.

Figure 8:
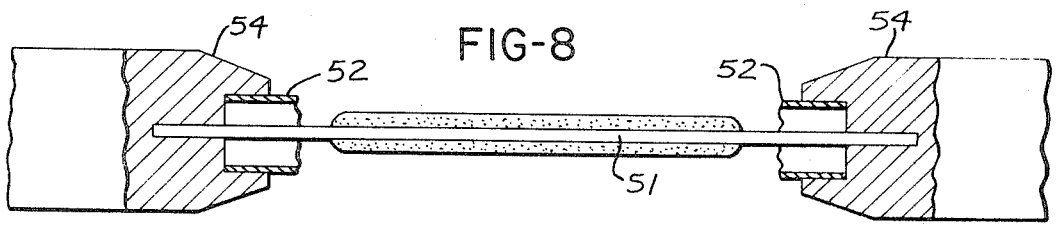
FIG. 8 is a view like FIG. 7 after the graphite pipe has been burned away.
Figure 9:
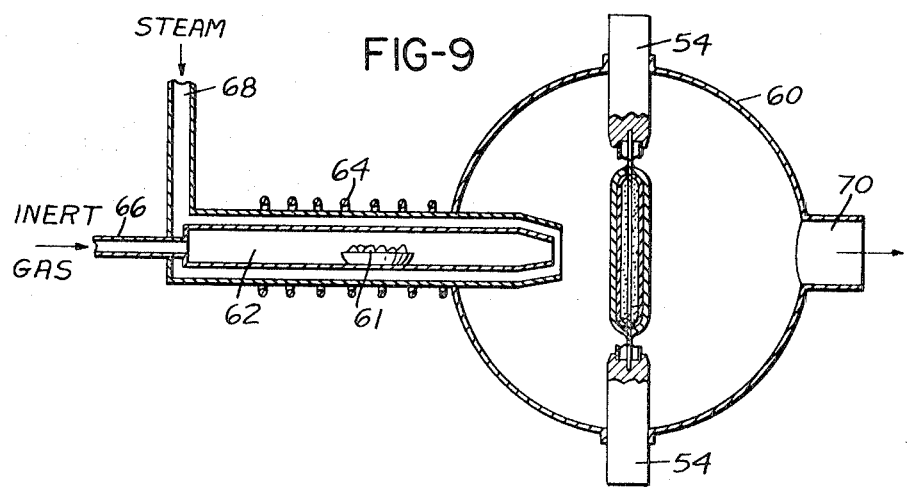
FIG. 9 shows the fuel element in a chamber and a coating layer being applied thereto.

In another modification shown in FIGS. 7 and 8, a hot conductive rod 40, for instance $Al_2O_3$, $ZrO_2$, MgO, or $ThO_2$, is coated with a nuclear fuel as set forth above. Thereupon, a thin graphite pipe 52 having an outer diameter of from 2.5 to 3.5 millimeters and an inner diameter of from 1 to 2 millimeters is placed over the rod 50 having the fuel coating 51 thereon as shown in FIG. 7. Holders 54 engage the ends of pipe 52. With the tube in vacuum or, in an inert gas atmosphere; for example, chamber 60 in FIG. 9, the graphite tube is heated by an electric current passed through holders 54, to such an extent, depending on the material, above 1,500° C., that the hot conductive rod likewise becomes conductive. Thereupon air is carefully admitted so that the graphite rod burns.

The electrically heated hot conductor is then coated as described above with pyrocarbon or silicon carbide or with the same material as the hot conductor. With a hot conductor rod of $Al_2O_3$, for example, $Al_2O_3$ may be formed on the rod by the hydrolysis of $AlCl_3$ at high temperatures of about from 1,600° to 2,200° C. This is done in FIG. 9 by heating a boat of $AlCl_3$ at 61 in inlet passage 62 by heating means 64, and admitting inlet gas via inlet 66 and steam via inlet 68 while reacted gases are withdrawn via outlet 70. The holders 54, as well as the other holders shown are preferably rotatable to give a uniform coating.

Figure 10:
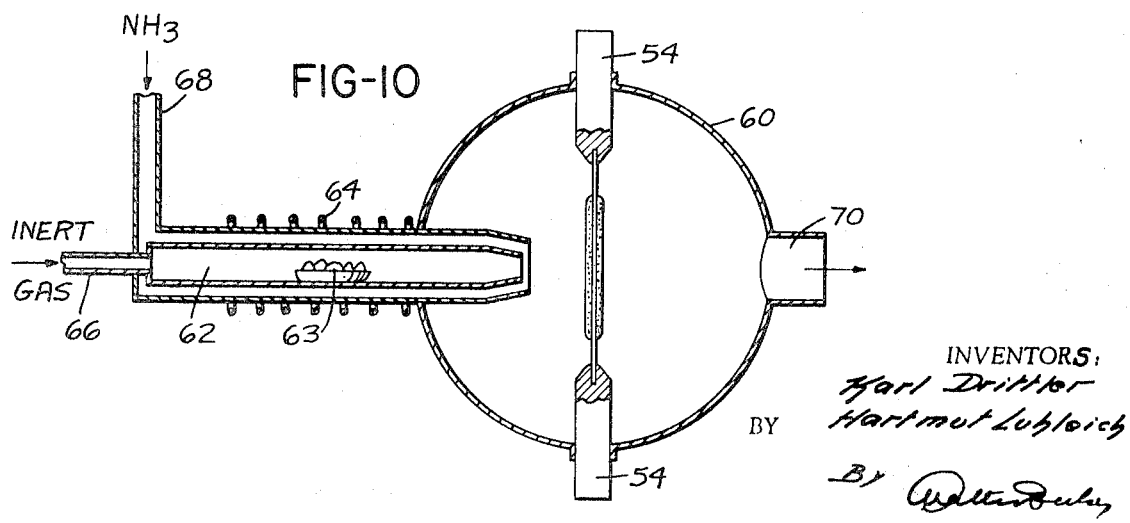
FIG. 10 is a view like FIG. 9, showing a different coating being applied.

Similar to $Al_2O_3$, which can be formed by hydrolysis from $Al_2O_3$, also the uranium nitride (UN) can be separated from a gas phase by ammonolysis of a uranium chloride (preferably $UCl_4$) at high temperatures at above 2,000° C. and deposited upon the carrier elements referred to above. The further coating is effected as described, and is shown in FIG. 10, wherein the same numerals are employed except for the boat of UN which is identified at 63.

FIG. 11 is a view which shows a fuel element according to the present invention in which the rodlike carrier element 80 has a buffer layer 82 thereon of pyrolytic graphite, for example, and over which buffer layer is the layer 84 of fuel material. Another buffer layer 86 covers fuel layer 84 and there may be one or more further layers 88 which may, as mentioned, consist of pyrolytic graphite or ceramic.

In the interior of the nuclear fuel and breeder material there is provided a wire-shaped carrier of a material which melts at a high temperature, as for instance molybdenum, tungsten, tantalum, or chromium. This wire-shaped core is coated with nuclear fuel or breeder material, as for instance uranium-235, uranium-233, thorium, uranium-238 or plutonium-239 in the form of their oxides, carbides or nitrides. These inner elements are covered by a mantle which may consist of pyrolytic graphite or ceramics. These two last-mentioned products, or materials, prevent the fission products from escaping toward the outside.

According to a modification of this nuclear fuel element a foam layer (buffer layer) is interposed between the nuclear fuel or breeder material and the mantle.

The foam or buffer layers are intended to absorb and compensate for the increase in the volume of the nuclear fuel or breeder material as it occurs during the reactor operation. As buffer layer, for instance, a pyrolytic carbon of low density or also foamlike silicon carbide has proved suitable.

A more or less dense graphite layer is obtained depending on the condition of the separation, i.e., pressure and temperature and the type of the hydrocarbon employed for the reaction. Less dense layers are obtained for instance by pyrolysis for instance by heating of acetylene.

The modifications of the present invention, illustrated and described, are merely exemplary and still other modifications and adaptations of the invention falling within the scope of the invention will occur to those skilled in the art.

What is claimed is:

1. The method of making a nuclear fuel element which comprises; depositing a layer of nuclear fuel material on a rodlike carrier member and sintering the said layer of fuel material, depositing at least one further layer of buffer material on the outer surface of said layer of fuel material by gaseous deposition, maintaining the element suspended from one end during the deposition of a first said further layer and the first said further layer being so deposited as to envelope the opposite free end of said element, suspending the element from the now enveloped end, and depositing a second said further layer thereon positively enveloping the now opposite free end of said element whereby said further layers completely envelop said element.

2. The method of making a nuclear fuel element which comprises; depositing a layer of nuclear fuel material on a rodlike carrier member and sintering the said layer of fuel material, depositing at least one further layer of buffer material on the outer surface of said layer of fuel material by gaseous deposition, flowing a gaseous compound laterally of the element during the deposition of said further layer, heating the element to cause decomposition of said gaseous compound at the surface of said element, and rotating the element to cause said further layer to deposit uniformly on the surface of said element.

3. A method according to claim 2 in which said carrier member is a rod of $Al_2O_3$ and said gaseous compound is formed by passing an inert gas over heated $AlCl_3$ and passing this gas mixed together with steam over the heated fuel element thereby to form a layer of $Al_2O_3$ on the outer surface of the fuel element.

4. A method according to claim 2 in which said fuel material comprises uranium nitride, and said second further layer is applied, and said gaseous compound is formed by passing an inert gas over heated $UCl_4$ and passing this gas together with $NH_3$ over the heated fuel element thereby to form a layer of uranium nitride on the outer surface of the fuel element.

* * * * *